United States Patent
Min et al.

(10) Patent No.: US 8,031,977 B2
(45) Date of Patent: Oct. 4, 2011

(54) IMAGE INTERPOLATION METHOD, MEDIUM AND SYSTEM

(75) Inventors: Kyoung-June Min, Yongin-si (KR); Dong-soo Kang, Hwaseong-si (KR); Jong-myon Kim, Yongin-si (KR); Eun-jin Ryu, Seoul (KR)

(73) Assignee: Samsung Electro-Mechanics Co., Ltd., Suwon-Si (KR)

( * ) Notice: Subject to any disclaimer, the term of this patent is extended or adjusted under 35 U.S.C. 154(b) by 1078 days.

(21) Appl. No.: 11/802,227

(22) Filed: May 21, 2007

(65) Prior Publication Data
US 2008/0025615 A1     Jan. 31, 2008

(30) Foreign Application Priority Data
Jul. 26, 2006  (KR) ................ 10-2006-0070454

(51) Int. Cl.
*G06K 9/32* (2006.01)
(52) U.S. Cl. ........ 382/300; 382/274; 382/275; 358/463; 358/525
(58) Field of Classification Search ............ 382/274, 382/275, 300; 358/3.26, 3.27, 525
See application file for complete search history.

(56) References Cited

U.S. PATENT DOCUMENTS

| | | | |
|---|---|---|---|
| 4,334,240 A | | 6/1982 | Franklin |
| 6,035,322 A | * | 3/2000 | Demura et al. ............ 709/201 |
| 6,665,450 B1 | * | 12/2003 | Cornog et al. ............ 382/276 |
| 6,865,246 B2 | * | 3/2005 | Yang ............................... 378/4 |
| 7,053,944 B1 | * | 5/2006 | Acharya et al. ............ 348/273 |
| 7,079,705 B2 | * | 7/2006 | Zhang et al. ............... 382/280 |
| 7,103,231 B2 | * | 9/2006 | Cornog et al. ............ 382/276 |
| 7,126,611 B1 | * | 10/2006 | Weed ........................... 345/589 |
| 7,231,076 B2 | * | 6/2007 | Fu et al. ..................... 382/131 |
| 7,251,056 B2 | * | 7/2007 | Matsushima ............... 358/1.9 |

OTHER PUBLICATIONS

Kasson et al., "Performing Color Space Conversions With Three-Dimensional Linear Interpolation", Journal of Electronic Imaging, vol. 4, No. 3, pp. 226-249 (24 pgs) (in English).
European Search Report for corresponding European Patent Application No. EP07104879 dated Jun. 22, 2007 (7 pgs) (in English).

* cited by examiner

*Primary Examiner* — Yosef Kassa
(74) *Attorney, Agent, or Firm* — Staas & Halsey LLP

(57) ABSTRACT

An image interpolation method interpolating image information of a point in a space constructed by a plurality of planes. According to the method, a reliable interpolated value can be rapidly obtained by searching for the nearest plane to the point, obtaining information about a plane facing the nearest plane using image information of one or more vertices of the plane facing the nearest plane, and interpolating the image information of the point using the image information of the one or more vertices of the nearest plane and the obtained information about the plane facing the nearest plane.

16 Claims, 12 Drawing Sheets

FIG. 7

| OPERATION / BASE-PLANE | FIRST INTERPOLATION | | SECOND INTERPOLATION | | AVERAGE VALUE CALCULATION | | | | INTERPOLATION ORDER | | |
|---|---|---|---|---|---|---|---|---|---|---|---|
| S1 | P1 | P2 | P5 | P6 | P3 | P4 | P2 | P8 | x AXIS | y AXIS | x AXIS |
| S2 | P6 | P7 | P5 | P8 | P1 | P2 | P3 | P4 | x AXIS | z AXIS | y AXIS |
| S3 | P1 | P4 | P5 | P8 | P2 | P3 | P6 | P7 | x AXIS | y AXIS | z AXIS |
| S4 | P3 | P4 | P7 | P8 | P1 | P2 | P5 | P6 | z AXIS | y AXIS | x AXIS |
| S5 | P2 | P3 | P1 | P4 | P5 | P6 | P7 | P8 | x AXIS | z AXIS | y AXIS |
| S6 | P2 | P3 | P6 | P7 | P1 | P4 | P5 | P8 | x AXIS | y AXIS | z AXIS |

US 8,031,977 B2

IMAGE INTERPOLATION METHOD, MEDIUM AND SYSTEM

CROSS-REFERENCE TO RELATED APPLICATIONS

This application claims the benefit of Korean Patent Application No. 10-2006-0070454, filed on Jul. 26, 2006, in the Korean Intellectual Property Office, the disclosure of which is incorporated herein in its entirety by reference.

BACKGROUND

1. Field

One or more embodiments of the present invention relate to interpolation, and more particularly, to a method, medium and system interpolating image information of a point in a three-dimensional space using image information of nearby vertices.

2. Description of the Related Art

Interpolation is used to estimate a value of a point using known values at other points.

Interpolation techniques may be developed to improve reliability of interpolated values or to increase interpolation speed. There is a trade-off between improvement in the reliability of the interpolated values and the speed of interpolation.

Accordingly, a new interpolation method capable of securing suitable reliability and suitable interpolation speed is needed.

SUMMARY

One or more embodiments of the present invention provide an image interpolation method capable of rapidly obtaining a reliable interpolated value.

One or more embodiments of the present invention also provide an image interpolation system capable of rapidly obtaining a reliable interpolated value.

One or more embodiments of the present invention also provide a computer-readable recording medium having embodied thereon a computer program for executing an image interpolation method capable of rapidly obtaining a reliable interpolated value.

Additional aspects and/or advantages of the invention will be set forth in part in the description which follows and, in part, will be apparent from the description, or may be learned by practice of the invention.

To achieve at least the above and/or other aspects and advantages, embodiments of the present invention include an image interpolation method interpolating image information of a point in a space formed by a plurality of planes. The method includes searching for a nearest plane to the point, obtaining information about a plane facing the nearest plane using image information of one or more vertices of the plane facing the nearest plane, and interpolating the image information of the point using the image information of the one or more vertices of the nearest plane and the obtained information about the plane facing the nearest plane.

To achieve at least the above and/or other aspects and advantages, embodiments of the present invention include an image interpolation system interpolating image information of a point in a space formed by a plurality of planes. The system includes a base-plane searching unit to search for a nearest plane to the point, an operation unit to compute information about a plane facing the nearest plane using image information of one or more vertices of the plane facing the nearest plane, and an interpolation unit to interpolate the image information of the point using the image information of the one or more vertices of the nearest plane and the computed information about the plane facing the nearest plane.

To achieve at least the above and/or other aspects and advantages, embodiments of the present invention include at least one medium including computer readable code to control at least one processing element in a computer to implement a method of interpolating image information of a point in a space formed by a plurality of planes. The method includes searching for a nearest plane to the point, obtaining information about a plane facing the nearest plane using image information of one or more vertices of the plane facing the nearest plane, and interpolating the image information of the point using the image information of the one or more vertices of the nearest plane and the obtained information about the plane facing the nearest plane.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7 illustrates a storage unit, for example as shown in FIG. 5, according to an embodiment of the present invention;

DETAILED DESCRIPTION OF EMBODIMENTS

Figure 1A:
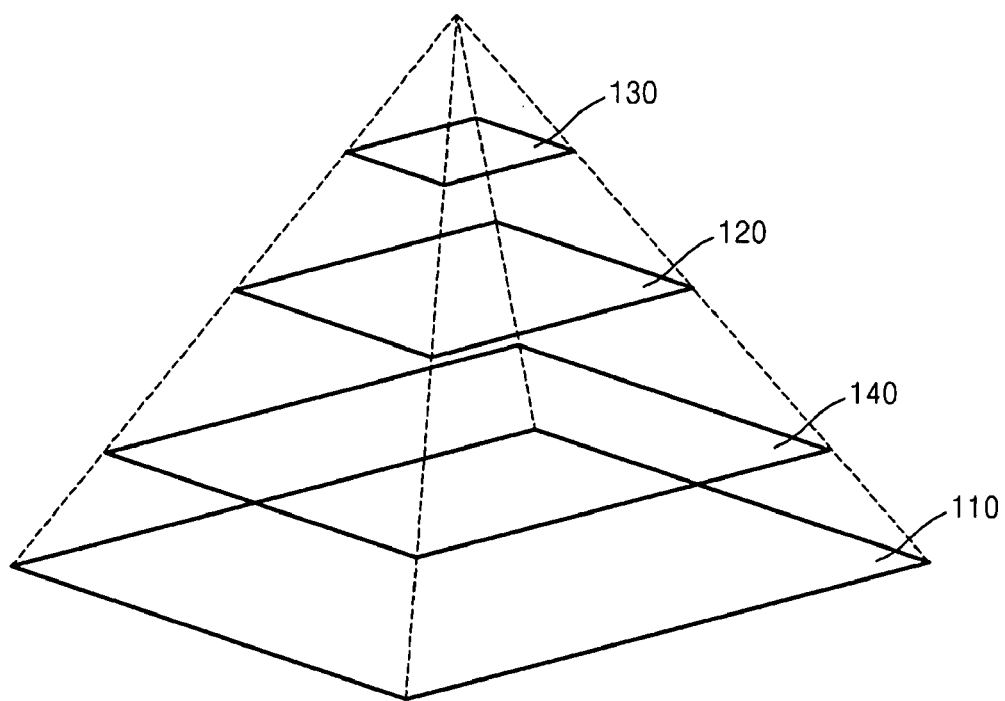
FIGS. 1A-1D illustrate a field of the invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 illustrates a field of the invention.

In order to display an authorized three-dimensional (3D) graphic data on a two-dimensional (2D) screen, the 3D graphic data generally needs to be rendered, that is, visualized.

Texture mapping is one of the procedures for rendering the 3D graphic data. Texture mapping may be used to apply a 2D image for representing a texture (hereinafter, referred to as "texture image") to a 3D model represented by the 3D graphic data.

In order to perform the rendering, a distance (hereinafter, referred to as "viewpoint distance") between the 3D model and a viewpoint may need to be defined. The longer the viewpoint distance, the lower the texture image resolution applied to the 3D model may be. On the contrary, the shorter the viewpoint distance, the higher the texture image resolution applied to the 3D model may be.

In order to perform texture mapping, a plurality of texture images with respect to a plurality of viewpoints may be stored in a rendering device. As shown in FIG. 1, three texture images 110, 120, and 130 with respect to three viewpoints may be stored in the rendering device. Here, the number of texture images is three for convenience of description and other quantities may be used.

In FIGS. 1A-1D, a relationship between the viewpoints and the resolution of the texture images is schematically shown.

Figure 1B:
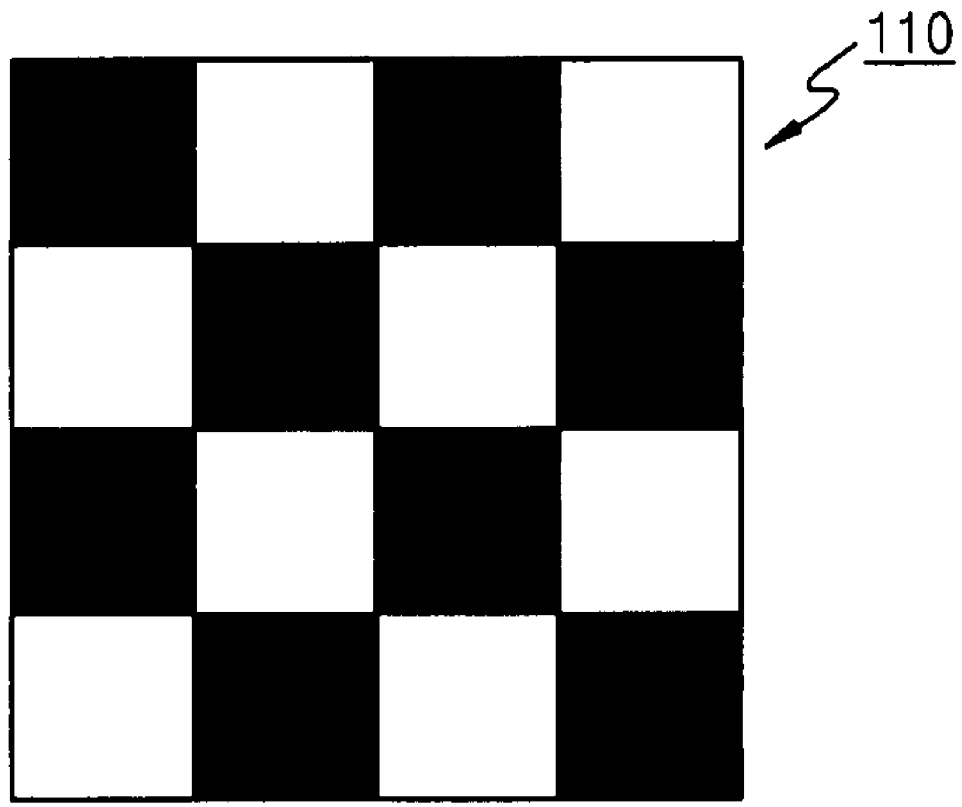
Figure 1C:
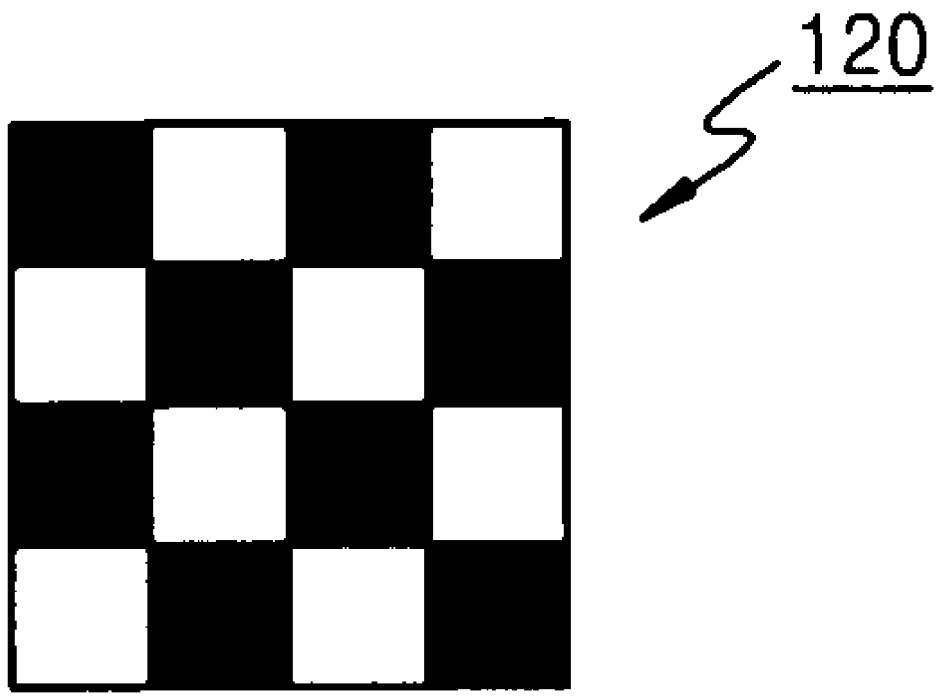
Figure 1D:
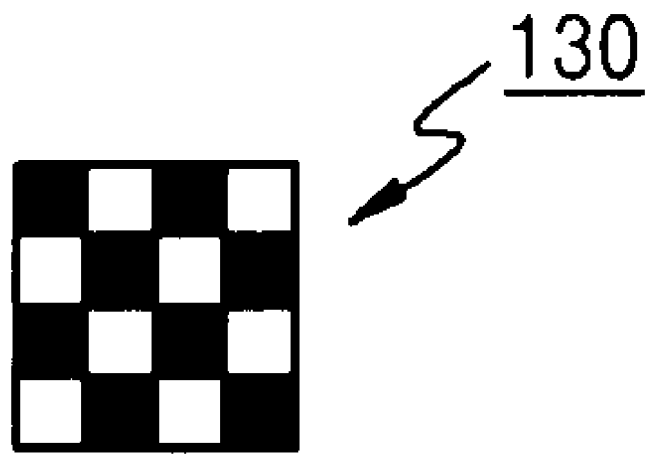

The resolution (for example, 512×512 pixels) of the texture image 110 shown in FIG. 1B may be twice that (for example, 256×256 pixels) of the texture image 120 shown in FIG. 1C. The resolution of the texture image 120 shown in FIG. 1(c) may be twice that (for example, 128×128 pixels) of the texture image 130 shown in FIG. 1D.

It may be impossible for the rendering device to store texture images with respect to all possible viewpoints. Therefore, when a texture image 140 that is to be applied to the 3D model is not stored in the rendering device, the texture image 140 that is to be applied to the 3D model may need to be interpolated using the stored texture images.

Various interpolation techniques may be used in rendering fields, and furthermore in various image processing fields. The various interpolation techniques may also be used in the image interpolation method, medium and system, according to an embodiment of the present invention.

Figure 2:
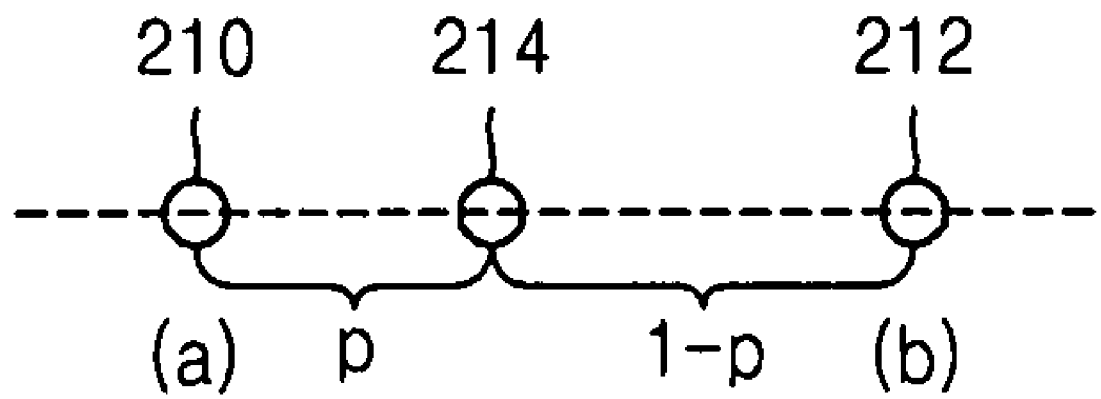
FIG. 2 illustrates a linear interpolation.

FIG. 2 illustrates linear interpolation. The linear interpolation may indicate an interpolation that is to be performed in one-dimension (1D).

As shown in FIG. 2, a value at a third point 214 may be interpolated using a value (a) at a first point 210 (for example, color information) and a value (b) at a second point 212. Specifically, the value at the third point 214 may be interpolated using Equation 1.

Interpolated value at the third point $214 = a*(1-p) + b*p$,  [Equation 1]

where p is positive value satisfying $0 \leq p \leq 1$.

Figure 3:
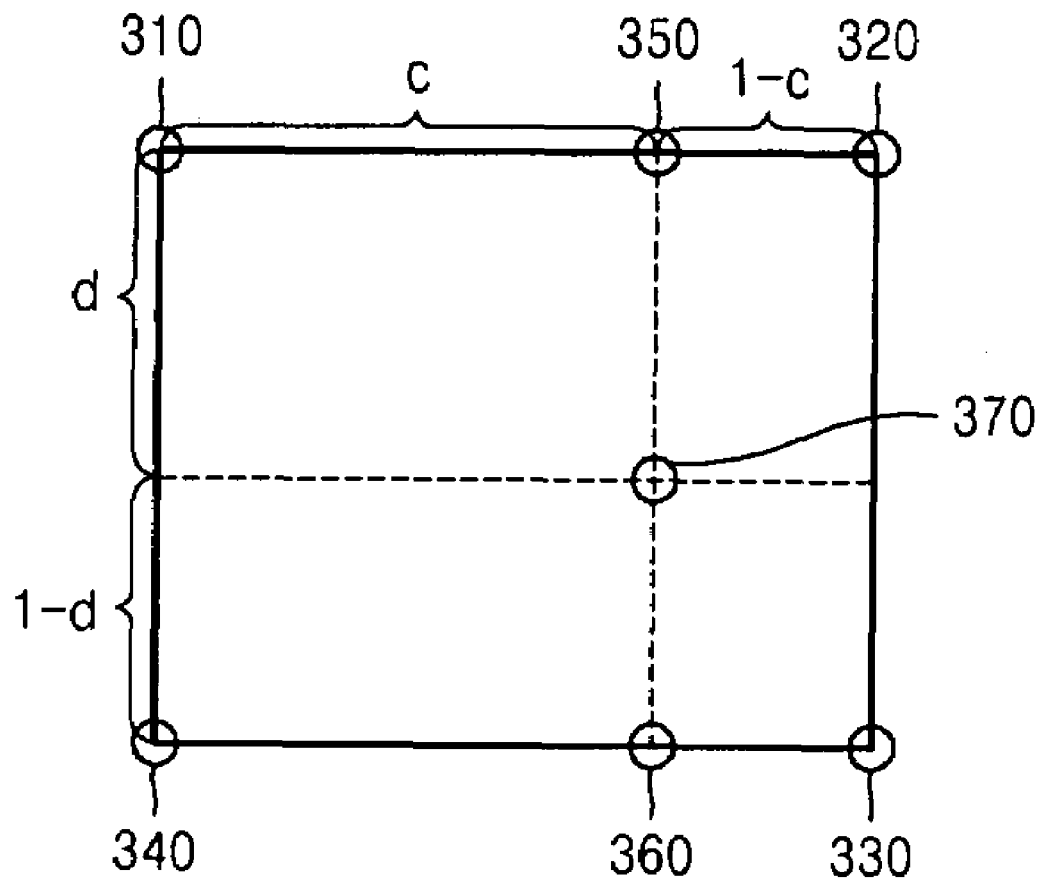
FIG. 3 illustrates a bilinear interpolation.

FIG. 3 illustrates a bilinear interpolation. The bilinear interpolation may indicate an interpolation to be performed in two-dimensions (2D).

As shown in FIG. 3, a value at a third point 370 may be interpolated using a value (for example, color information) at a first vertex 310, a value at a second vertex 320, a value at a third vertex 330, and a value at a fourth vertex 340, for example.

Specifically, the value at the third point 370 may be interpolated using Equation 2.

Interpolated value at a first point $350 = $ value at the first vertex $310*(1-c) + $ value at the second vertex $320*c$;  [Equation 2]

Interpolated value at a second point $360 = $ value at the third vertex $330*c + $ value at the fourth vertex $340*(1-c)$;

Interpolated value at the third point $370 = $ interpolated value at the first point $350*(1-d) + $ interpolated value at the second point $360*d$; and where, $\begin{pmatrix} c \text{ is positive value satisfying } 0 \leq c \leq 1 \\ d \text{ is positive value satisfying } 0 \leq d \leq 1 \end{pmatrix}$.

Figure 4:
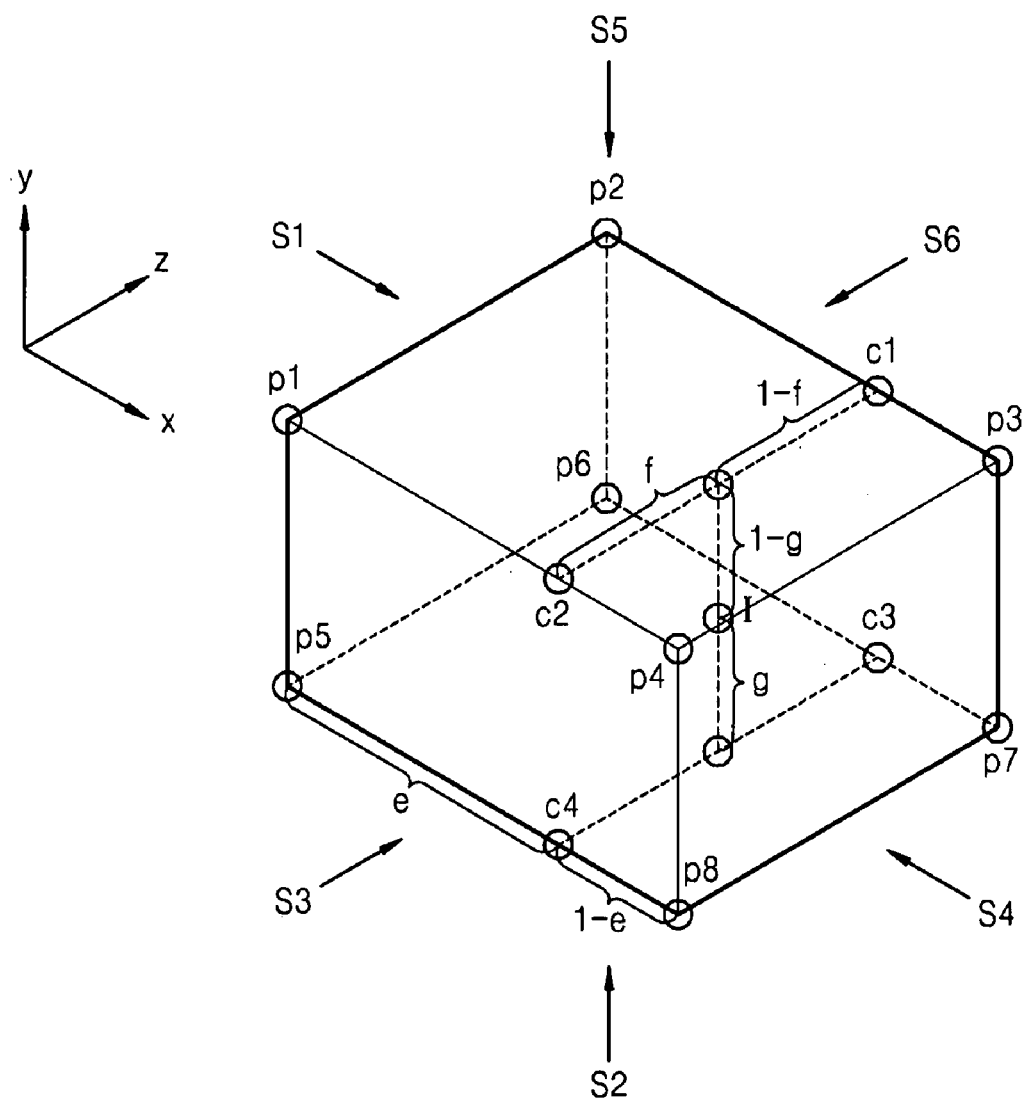
FIG. 4 illustrates a trilinear interpolation.

FIG. 4 illustrates a trilinear interpolation. The trilinear interpolation indicates an interpolation to be performed in three-dimensions (3D).

As shown in FIG. 4, a value at a point I may be interpolated using a value (for example, color information) at a first vertex P1 and values at second to eighth vertices P2 to P8.

Specifically, the value at the point I may be interpolated using Equation 3.

Interpolated value at a first point $C1 = $ value at the second vertex $P2*(1-e) + $ value at the third vertex $P3*e$;  [Equation 3]

Interpolated value at a second point $C2 = $ value at the first vertex $P1*(1-e) + $ value at the fourth vertex $P4*e$;  [Equation 3]

Interpolated value at a third point $C3 = $ value at the sixth vertex $P6*(1-e) + $ value at the seventh vertex $P7*e$;

Interpolated value at a fourth point $C4 = $ value at the fifth vertex $P5*(1-e) + $ value at the eighth vertex $P8*e$;

Interpolated value at a fifth point $C5 = $ interpolated value at the first point $C1*f + $ interpolated value at the second point $C2*(1-f)$;

Interpolated value at a sixth point $C6 = $ interpolated value at the third point $C3*f + $ interpolated value at the fourth point $C4*(1-f)$;

Interpolated value at the point $I = $ interpolated value at the fifth point $C5*g + $ interpolated value at the sixth point $C6*(1-g)$; and where $\begin{pmatrix} e \text{ is positive value satisfying } 0 \leq e \leq 1 \\ f \text{ is positive value satisfying } 0 \leq f \leq 1 \\ g \text{ is positive value satisfying } 0 \leq g \leq 1 \end{pmatrix}$.

An improved interpolation method (hereinafter, referred to as pyralinear interpolation method) as compared with the interpolation techniques illustrated in FIGS. 2 to 4 will be disclosed below.

Figure 5:
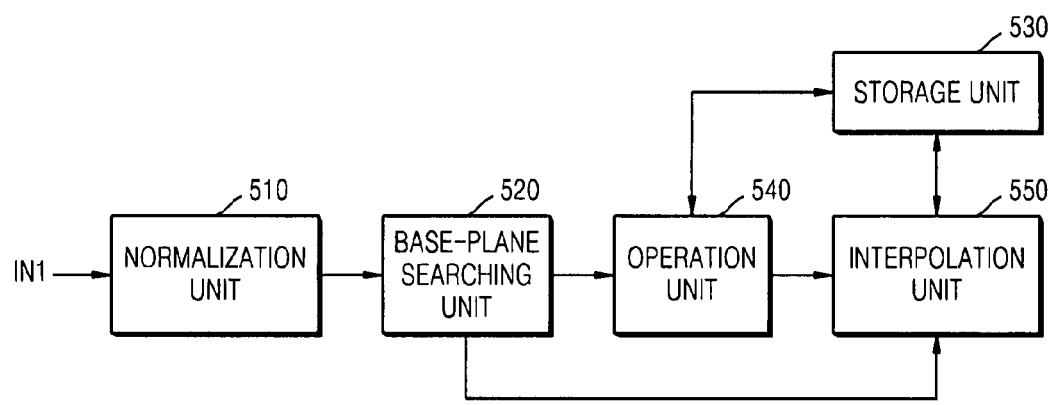
FIG. 5 illustrates an image interpolation system, according to an embodiment of the present invention.

FIG. 5 illustrates an image interpolation system according to an embodiment of the present invention. The image interpolation system includes, for example, a normalization unit 510, a base-plane searching unit 520, a storage unit 530, an operation unit 540, and an interpolation unit 550.

The normalization unit 510 may normalize location information on vertices input through an input terminal IN1. The location information may be 3D information and may include x-axis, y-axis, and z-axis information, for example.

Hereinafter, for convenience of description, it may be assumed that the vertices input though the input terminal IN1 correspond to vertices of a plurality of cubes, and a cube including the point 1, as shown in FIG. 4, of which image information to be interpolated is among the plurality of cubes. In addition, color information, in which white is represented by 0, and gray is represented by one of 1 to 254, may be an example of the image information described for one or more embodiments of the present invention.

The base-plane searching unit 520 may search for the nearest plane to the point 1, for example, of which the image information is to be interpolated among six planes S1 to S6 which constitute the cube. Hereinafter, for convenience of description, it may be assumed that the nearest plane is the plane S3.

The storage unit 530 may store image information about the vertices input through the input terminal IN1.

According to a first embodiment of the present invention, the operation unit 540 may read image information of one or more vertices, for example, P2, P3, P6, and P7 of the plane S6 facing the plane S3, found by the base-plane searching unit 520 stored in the storage unit 530.

In addition, the operation unit 540 may compute information on an oppositely facing plane, e.g., S6, using the read image information (the read image information of the vertices P2, P3, P6, and P7). The information on the facing plane may indicate any image information that may be computed using the image information of the vertices of the plane facing the plane found by the base-plane searching unit 520. For example, the operation unit 540 may average the read image information (the read image information of the vertices P2, P3, P6, and P7), thereby computing the information about the facing plane.

Alternatively, according to a second embodiment of the present invention, the operation unit 540 may read the image information of the one or more vertices P1, P4, P5, and P8 of the plane S3 found by the base-plane searching unit 520 stored in the storage unit 530.

In addition, the operation unit 540 may estimate the image information of the one or more vertices P2, P3, P6, and P7 of the plane S6 facing the plane found by the base-plane searching unit 520 using the read image information (e.g., the read image information of the vertices P2, P3, P6, and P7). For example, the operation unit 540 may estimate that the image information of the one or more vertices P2, P3, P6, and P7 of the facing plane S6 is an average of the read image information (e.g., the read image information of the vertices P1, P4, P5, and P8). Furthermore, the operation unit 540 may compute the information about the facing plane using the estimated image information (e.g., the estimated image information of the vertices P2, P3, P6, and P7). For example, the operation unit 540 may compute the information about the facing plane by averaging the estimated image information (e.g., the estimated image information of the vertices P2, P3, P6, and P7). However, as exemplified above, when the operation unit 540 estimates that the pieces of the image information of the one or more vertices P2, P3, P6, and P7 of the facing plane S6 are the same, the operation unit 540 may determine that one piece of the image information among the pieces of the estimated image information (e.g., the pieces of the estimated image information of the one or more vertices P2, P3, P6, and P7) is the information on the facing plane.

According to the first embodiment of the present invention, the interpolation unit 550 may read the image information of one or more vertices P1, P4, P5, and P8 of the plane S3 found by the base-plane searching unit 520 stored in the storage unit 530. On the other hand, according to the second embodiment of the present invention, the interpolation unit 550 may receive the read image information (the read image information of the vertices P1, P4, P5, and P8) from the operation unit 540.

The interpolation unit 550 may interpolate the image information of the point I using the read image information (the read image information of the vertices P1, P4, P5, and P8) and the information on the facing plane computed, for example, by the operation unit 540.

According to the first embodiment, the image information that is to be read from the storage unit 530 may be the image information of the vertices P1, P4, P5, and P8 of the plane S3 and the image information of the vertices P2, P3, P6, and P7 of the plane S6. On the contrary, according to a second embodiment, the image information of the vertices P2, P3, P6, and P7 of the plane S6 need not be read from the storage unit 530. Therefore, in the second embodiment, the frequency of communication with the storage unit 530 may be remarkably reduced.

Figure 6:
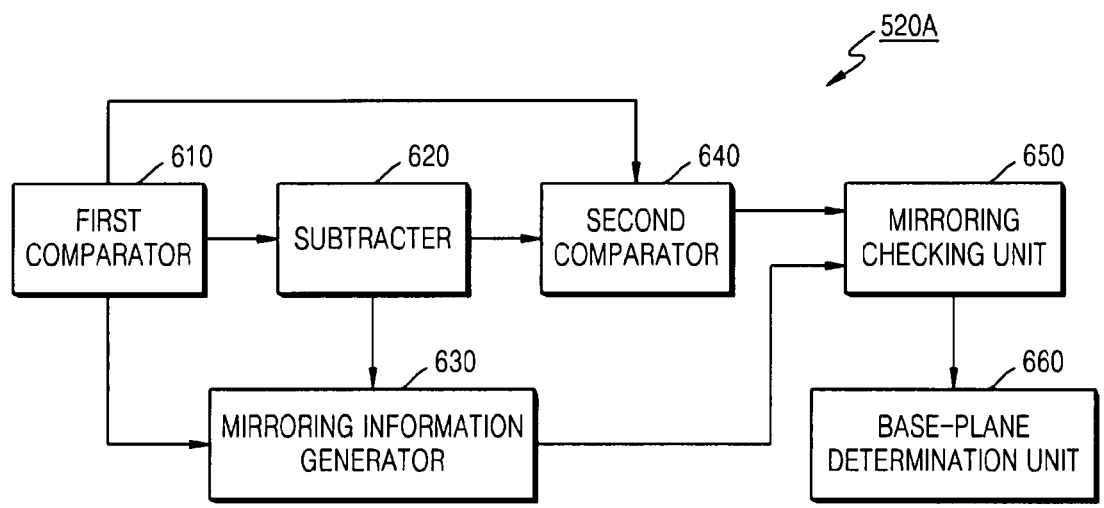
FIG. 6 illustrates a base-plane searching unit, for example as shown in FIG. 5, according to an embodiment of the present invention.

FIG. 6 illustrates the base-plane searching unit 520 shown in FIG. 5 according to an embodiment (520A) of the present invention. The searching unit 520 may include, for example, a first comparator 610, a subtracter 620, a mirroring information generator 630, a second comparator 640, a mirroring checking unit 650, and a base-plane determination unit 660.

The first comparator 610 may compare each component of the coordinates (e, g, f) of the point I of which the image information is to be interpolated using a reference value, e.g., 0.5. Since location information of all the vertices may be normalized by the normalization unit 510, each component of the coordinates (e.g. f) of the point I may range from 0 to 1.

As described in FIG. 4, e indicates a distance between the point I and the plane S1, g indicates a distance between the point I and the plane S2, and f indicates a distance between the point I and the plane S3.

That is, when the coordinate (e) of the x-axis component of the point I is equal to or less than 0.5, the point I is closer to the plane S1 than to the plane S4. When the coordinate (g) of the y-axis component of the point I is equal to or less than 0.5, the point I is closer to the plane S2 than to the plane S5. When the coordinate (f) of the z-axis component of the point I is equal to or less than 0.5, the point I is closer to the plane S3 than to the plane S6. Hereinafter, for convenience of description and as an example, it may be assumed that (e.g. f)=(0.4, 0.7, 0.2).

Specifically, when it is determined by the first comparator 610 that the coordinate (e) of the x-axis component of the point I is equal to or less than 0.5, the first comparator 610 may determine that the point I is closer to the plane S1 than to the plane S4 and output the coordinate (0.4) to the second comparator 640.

Similarly, when it is determined by the first comparator 610 that the coordinate (g) of the y-axis component of the point I is equal to or less than 0.5, the first comparator 610 may determine that the point I is closer to the plane S5 than to the plane S2 and output the coordinate (0.7) to the subtracter 620.

Similarly, when it is determined by the first comparator 610 that the coordinate (f) of the z-axis component of the point I is equal to or less than 0.5, the first comparator 610 may determine that the point I is closer to the plane S3 than to the plane S6 and output the coordinate (0.2) to the second comparator 640.

Finally, the first comparator 610 may reduce candidates of the nearest plane to the point I from six planes S1, S2, S3, S4, S5, and S6 to three planes S1, S5, and S3.

On the other hand, the subtracter 620, the mirroring information generator 630, the second comparator 640, the mirroring checking unit 650, and the base-plane searching unit 660 may search for the nearest plane to the point I among the three planes S1, S5, and S3.

The subtracter 620 may operate only when it is determined by the first comparator 610 that the coordinates are greater than 0.5. Specifically, when it is determined by the first comparator 610 that the coordinates are greater than 0.5 (0.7>0.5), the subtracter 620 may change the coordinate (0.7) of the point I to the result (0.3)' by subtracting the coordinate (0.7) of the point I from 1 and may output the changed coordinate (0.3)' to the second comparator 640.

The mirroring information generator 630 may generate mirroring information according to instructions of the first comparator 610 and the subtracter 620, for example. In an embodiment, the mirroring information may be constructed using three bits. For example, when it is determined by the first comparator 610 that the coordinates are equal to or less than 0.5, the mirroring information generator 630 may generate a bit that represents 0, according to the instruction of the first comparator 610. In addition, when it is determined by the first comparator 610 that the coordinates are greater than 0.5, and the subtracter 620 operates, the mirroring generator 630 may generate a bit that represents 1. Under the aforementioned assumption, the mirroring information generator 630 may generate the mirroring information that represents 010.

The second comparator 640 may compare coordinates (0.4, 0.2)' received from the first comparator 610 with the coordinate (0.3)' received from the subtracter 620. Accordingly, the second comparator 640 may search for the least value among the coordinates (0.4, 0.2)' received from the first comparator 610 and the coordinate (0.3)' received from the subtracter 620 and may output the found coordinate (0.2) to the mirroring checking unit 650.

The mirroring checking unit 650 may check whether the mirroring is to be performed or not by analyzing the mirroring information (last '0' of 010) related to the axis component (z-axis component) of the coordinate received from the second comparator 640. When the mirroring bit is 0, mirroring may not need to be performed. On the contrary, when the mirroring bit is 1, mirroring may need to be performed.

When it is checked that the mirroring need not be performed, the base-plane determination unit 660 may determine that the plane S3 to be the nearest plane to the point I according to the coordinate (0.2) received from the second comparator 640 may be the plane that is to be searched for by the base-plane searching unit 510.

When it is determined that the mirroring needs to be performed, the base-plane determination unit 660 may determine that the plane S6 (that is, the mirrored plane) facing the plane S3 to be the nearest plane to the point I according to the coordinate (0.2) received from the second comparator 640 is the plane that is to be searched for by the base-plane searching unit 510, which differs from the aforementioned assumption.

Figure 8:
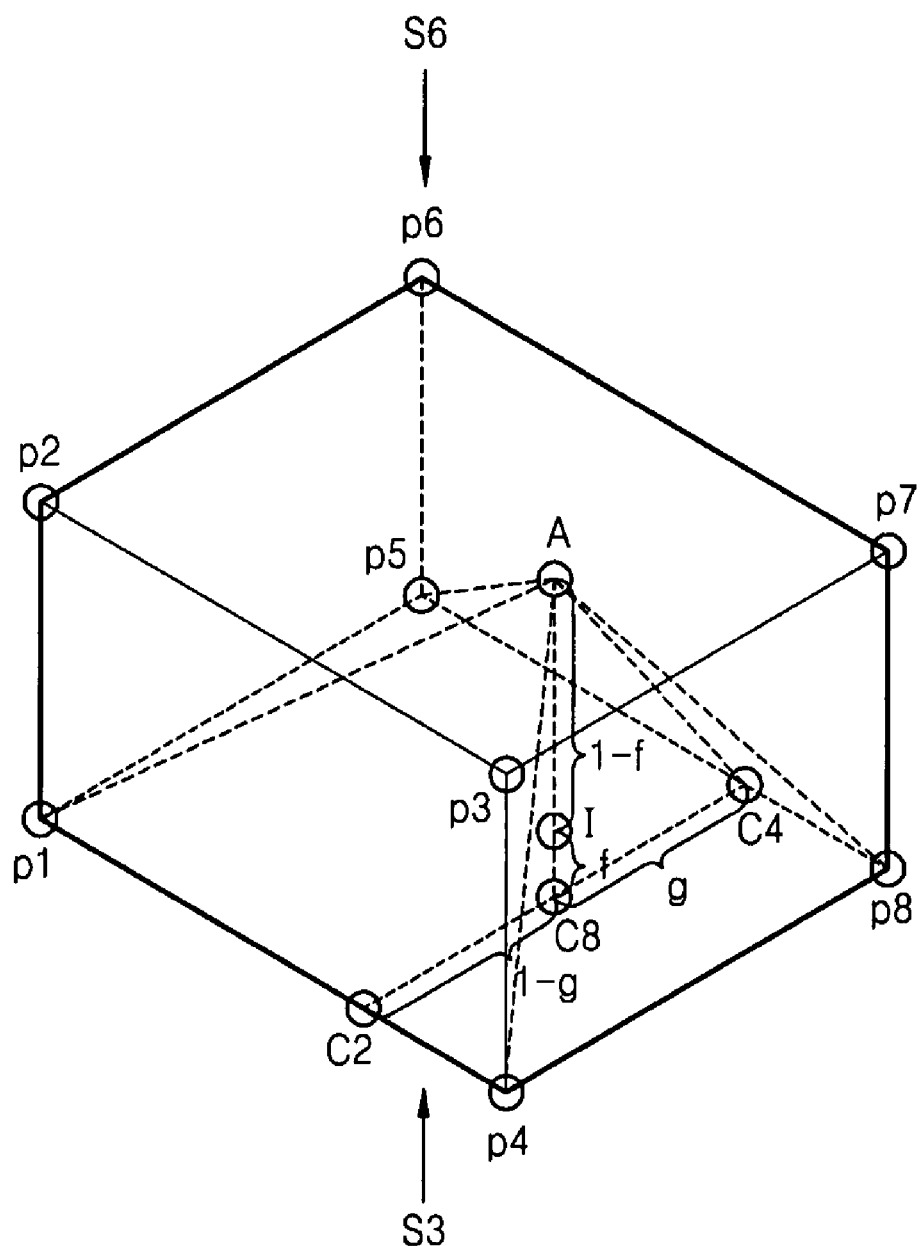
FIG. 8 illustrates an interpolation unit, for example as shown in FIG. 5, according to an embodiment of the present invention.

FIG. 7 illustrates a storage unit 530, for example as shown in FIG. 5. FIG. 8 illustrates an interpolation unit 550, for example as shown in FIG. 5. Specifically, FIG. 8 illustrates FIG. 4, such that the plane S3 found by the base-plane searching unit 520 may be the base-plane of the lattice.

The storage unit 530 may store the image information and an operation rule of the interpolation unit 550 in a form of a look-up table (LUT) as shown in FIG. 7.

When the plane found by the base-plane searching unit 520 is the plane S3, the operation rule stored in the storage unit 530 may be that interpolations between the vertices P1 and P4, or P5 and P8 located in parallel with the x-axis may be performed, and an interpolation between the points C2 and C4 located in parallel with the y-axis may be performed, and an interpolation between the points C8 and A located in parallel with the z-axis may be performed. It may need to be determined which interpolation is performed first of the interpolation between the vertices P1 and P4 and the interpolation between the vertices P5 and P8. According to the operation rule stored in the storage unit 530, the interpolation between the vertices P1 and P4 may be performed first. In addition, according to the operation rule stored in the storage unit 530, the information on the facing plane may be an average of the pieces of the image information of the vertices P2, P3, P6, and P7.

The interpolation unit 550 may read the stored operation rule and performs interpolation according to the read operation rule.

As described above, the interpolation unit 550 may interpolate the image information of the point I using the image information of the one or more vertices P1, P4, P5, and P8 of the plane S3 found by the base-plane searching unit 520, and the information on the facing plane computed by the operation unit 540.

Finally, the interpolation unit 550 may interpolate the image information of the point I using Equation 4.

Interpolated image information of the second point
$C2$=image information of the first vertex $P1*(1-e)$+image information of the fourth vertex $P4*e$; [Equation 4]

Interpolated image information of the fourth point $C4$=image information of the fifth vertex $P5*(1-e)$+image information of the eighth vertex $P8*e$;

Interpolated image information of the eighth point $C8$=interpolated image information of the second vertex $P2*g$+interpolated image information of the fourth point $C4*(1-g)$; and Interpolated image information of the point I=interpolated image information of the eighth point $C8*(1-f)$+information on the facing plane$*f$.

Referring to Equation 4, the information on the facing plane may be treated as image information of an intersection point A between an extension line connecting the eighth point C8 and the point I and the plane S6.

Figure 9:
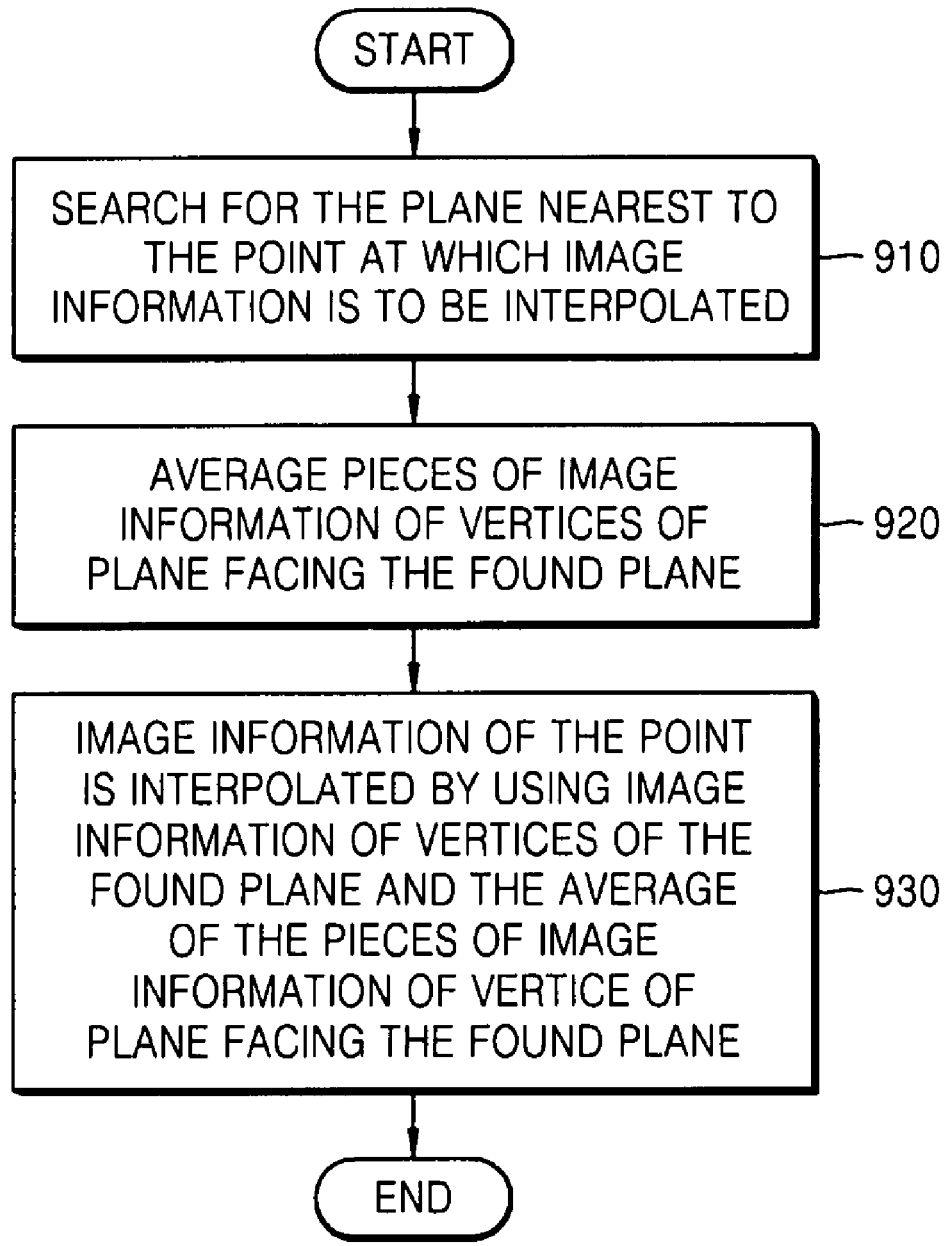
FIG. 9 illustrates an image interpolation method, according to an embodiment of the present invention.

FIG. 9 illustrates an image interpolation method, according to an embodiment of the present invention.

The planes surrounding the point may be searched for the plane nearest to the point at which the image information is to be interpolated, for example by the base-plane searching unit 520, in operation 910.

Information about the facing plane may be obtained, e.g., by the operation unit 540, using the image information of the one or more vertices of the plane facing the plane found in operation 910, in operation 920.

The image information of the point using the image information of the one or more vertices of the plane found in operation 910 may be interpolated e.g., using the interpolation unit 550 and the information about the facing plane obtained in operation 920, in operation 930.

In addition to the above described embodiments, embodiments of the present invention may also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

As described above, the image interpolation method, medium and system according to embodiments of the present invention have an advantage of rapidly obtaining a reliable interpolated value. Specifically, in the image interpolation method according to an embodiment of the present invention, that is, in the pyralinear interpolation method, interpolation may be performed faster than, for example, in the trilinear interpolation method. More specifically, the linear interpolation may need to be performed four to eight times in order to perform the trilinear interpolation once, depending an an embodiment of the present invention. In addition, in the pyralinear interpolation according to the first embodiment of the present invention, because the read image information of the eight vertices is needed to perform the pyralinear interpolation once, and similarly the read image information of the eight vertices is needed to perform the trilinear interpolation once, though in the pyralinear interpolation, remarkably small numbers of linear interpolations are performed, the value interpolated by the pyralinear interpolation may approach the value interpolated by the trilinear interpolation. On the other hand, since the base-plane searching unit 520, which in one or more embodiments, is one of the important components of the image interpolation system, may be embodied by a low priced operation unit such as a comparator instead of a high priced operation unit such as a multiplier, and thus the image interpolation system according to embodiments of the present invention may be embodied at low cost.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image interpolation method interpolating image information of a point in a space formed by a plurality of planes, the method comprising:
    searching for a nearest plane to the point;
    obtaining information about a plane facing the nearest plane using image information of one or more vertices of the plane facing the nearest plane; and
    interpolating the image information of the point using the image information of the one or more vertices of the nearest plane and the obtained information about the plane facing the nearest plane.

2. The method of claim 1, wherein in the obtaining, the image information of the one or more vertices of the facing plane among previously stored pieces of image information is read, and the information about the facing plane is obtained using the read image information, and
    wherein in the interpolating, the image information of the one or more vertices of the nearest plane among the stored pieces of the image information is read, and the image information of the point is interpolated using the read image information of the one or more vertices of the nearest plane and the obtained information about the facing plane.

3. The method of claim 1, wherein in the obtaining, the image information of the one or more vertices of the nearest plane among previously stored pieces of image information is read, the image information of the one or more vertices of the facing plane is estimated, and the information about the facing plane is obtained using the estimated image information, and
    wherein in the interpolating, the image information of the point is interpolated using the read image information and the obtained information about the facing plane.

4. The method of claim 1, wherein in the obtaining, the information about the facing plane is obtained by averaging pieces of the image information of the vertices of the facing plane.

5. The method of claim 1, wherein the space is formed by a plurality of lattices each comprising a plurality of planes, and the information about the facing plane is estimated image information of a point on the facing plane.

6. An image interpolation system interpolating image information of a point in a space formed by a plurality of planes, the system comprising:
    a base-plane searching unit to search for a nearest plane to the point;
    an operation unit to compute information about a plane facing the nearest plane using image information of one or more vertices of the plane facing the nearest plane; and
    an interpolation unit to interpolate the image information of the point using the image information of the one or more vertices of the nearest plane and the computed information about the plane facing the nearest plane.

7. The system of claim 6, further comprising a storage unit to store the image information of the vertices of the plurality of planes,
    wherein the operation unit reads the image information of the one or more vertices of the facing plane among pieces of the stored image information, and the information about the facing plane is computed using the read image information, and
    wherein the interpolation unit reads the image information of the one or more vertices of the nearest plane among the pieces of the stored image information, and the image information of the point is interpolated using the read image information of the one or more vertices of the nearest plane and the computed information about the facing plane.

8. The system of claim 6, further comprising a storage unit to store the image information of the vertices of the plurality of planes,
    wherein the operation unit reads the image information of the one or more vertices of the nearest plane among pieces of the stored image information, and the image information of the one or more vertices of the facing plane is estimated using the read image information, and the information about the facing plane is computed using the estimated image information, and
    wherein the interpolation unit interpolates the image information of the point using the read image information and the computed information about the facing plane.

9. The system of claim 6, wherein the operation unit computes the information on the facing plane by averaging pieces of the image information of the vertices of the facing plane.

10. The system of claim 6, wherein the base-plane searching unit searches the nearest plane to the point among planes perpendicular to each axis direction.

11. The system of claim 6, wherein the space is formed by a plurality of lattices each comprising a plurality of planes, and the information on the facing plane is estimated image information of a point on the facing plane.

12. At least one medium comprising non-transitory computer readable code to control at least one processing element in a computer to implement a method of interpolating image information of a point in a space formed by a plurality of planes, the method comprising:
    searching for a nearest plane to the point;
    obtaining information about a plane facing the nearest plane using image information of one or more vertices of the plane facing the nearest plane; and
    interpolating the image information of the point using the image information of the one or more vertices of the nearest plane and the obtained information about the plane facing the nearest plane.

13. The medium of claim 12, wherein in the obtaining, the image information of the one or more vertices of the facing plane among previously stored pieces of image information is read, and the information about the facing plane is obtained using the read image information, and wherein in the interpolating, the image information of the one or more vertices of the nearest plane among the stored pieces of the image information is read, and the image information of the point is interpolated using the read image information of the one or more vertices of the nearest plane and the obtained information about the facing plane.

14. The medium of claim 12, wherein in the obtaining, image information of the one or more vertices of the nearest plane among previously stored pieces of image information is read, the image information of the one or more vertices of the facing plane is estimated, and the information about the facing plane is obtained using the estimated image information, and wherein in the interpolating, the image information of the point is interpolated using the read image information and the obtained information about the facing plane.

15. The medium of claim 12, wherein in the obtaining, the information about the facing plane is obtained by averaging pieces of the image information of the vertices of the facing plane.

16. The medium of claim 12, wherein the space is formed by a plurality of lattices each comprising a plurality of planes, and the information about the facing plane is estimated image information of a point on the facing plane.

* * * * *